United States Patent [19]
Dobras

[11] 4,108,368
[45] Aug. 22, 1978

[54] CODED RECORD AND METHOD OF AND SYSTEM FOR INTERPRETING THE RECORD

[75] Inventor: Bruce W. Dobras, Dayton, Ohio

[73] Assignee: Monarch Marking Systems, Inc., Dayton, Ohio

[21] Appl. No.: 727,393

[22] Filed: Sep. 29, 1976

Related U.S. Application Data

[63] Continuation of Ser. No. 104,955, Jan. 8, 1971, abandoned.

[51] Int. Cl.² .................. G06K 7/10; G06K 19/06; G06K 9/00
[52] U.S. Cl. .................................... 235/463; 235/494; 340/146.3 Z
[58] Field of Search ............... 235/61.12 N, 61.11 E, 235/463, 462, 487, 494; 250/555, 566, 568, 569; 340/146.3 Z, 146.3 F, 146.32

[56] References Cited

U.S. PATENT DOCUMENTS

| | | | |
|---|---|---|---|
| 3,277,283 | 10/1966 | Rabinow | 340/146.3 K |
| 3,446,351 | 5/1969 | Born | 209/111.7 |
| 3,543,007 | 11/1970 | Brinker | 340/146.3 K |
| 3,562,494 | 2/1971 | Schmidt | 235/61.11 E |
| 3,597,752 | 8/1971 | Eldert | 340/174.1 H |
| 3,622,758 | 11/1971 | Schanne | 340/146.3 K |
| 3,636,317 | 1/1972 | Torrey | 235/61.12 N |
| 3,671,722 | 6/1972 | Christie | 235/61.12 N |
| 3,701,097 | 10/1972 | Wolff | 235/61.11 E |
| 3,701,886 | 10/1972 | Jones | 235/61.11 E |
| 3,716,699 | 2/1973 | Eckert | 235/61.11 E |
| 3,723,710 | 3/1973 | Crouse | 235/61.11 E |

*Primary Examiner*—Daryl W. Cook
*Attorney, Agent, or Firm*—Mason, Kolehmainen, Rathburn & Wyss

[57] ABSTRACT

A machine-readable record or label includes alternating areas of different reflectivity providing a binary coded data record. The record is made by selecting the widths of the areas such that an increase in the relative widths of any two consecutive areas of different characteristics represents a binary "1" and a decrease in the relative widths of any two consecutive areas represents a binary "0". Thus, each area in the part of the code is used in the establishment of the values of two different binary bits. A method of and a system for reading or interpreting the record or label includes a pair of light reader controlled registers in which are alternately stored the widths of consecutive areas. A comparator coupled to the registers determines whether each newly stored width is greater than or less than the width of the previously stored area. In accordance with this determination, the comparator stores a "1" or a "0" in a shift register, the contents of which are transferred out as each complete character is received.

20 Claims, 7 Drawing Figures

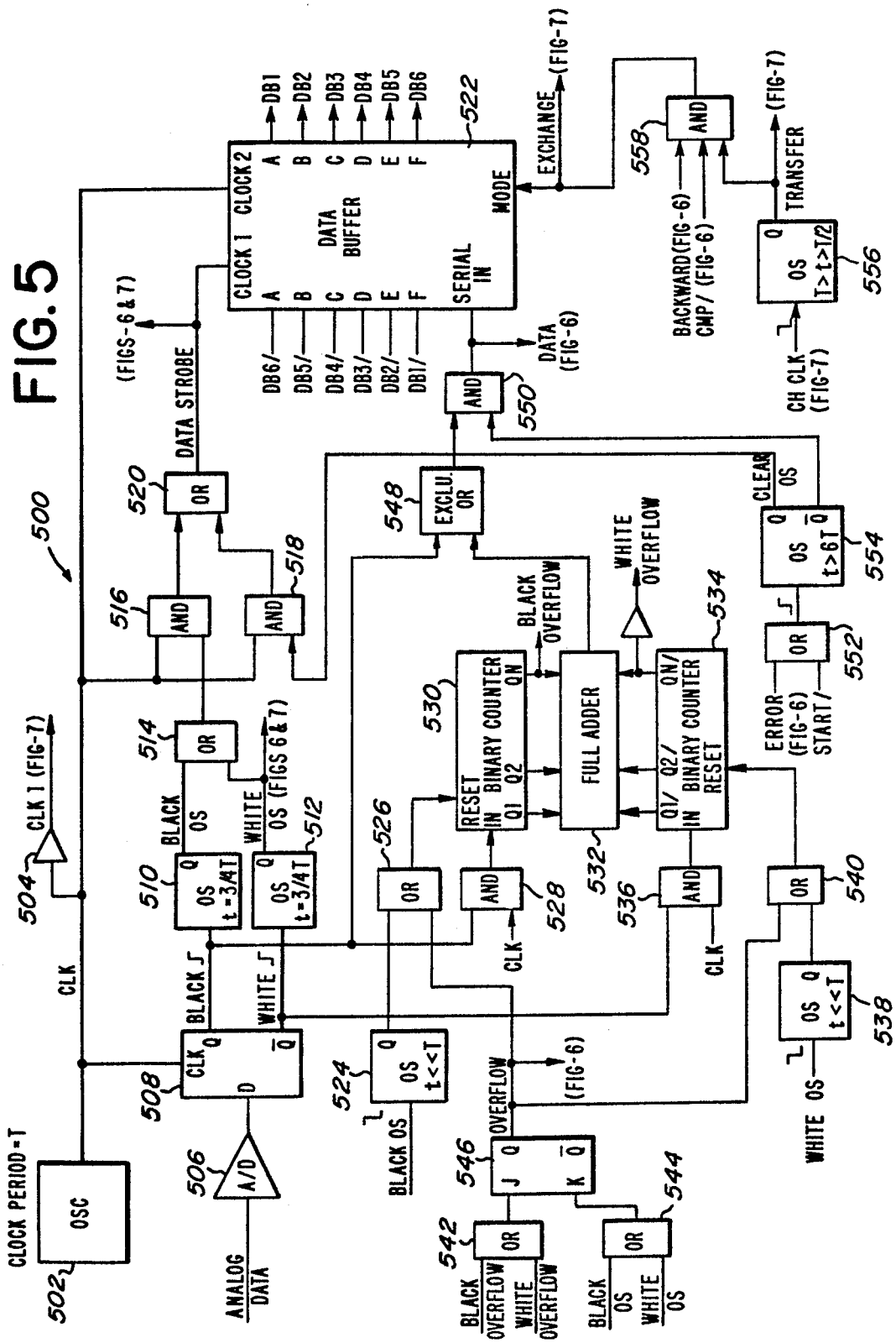

FIG. 7
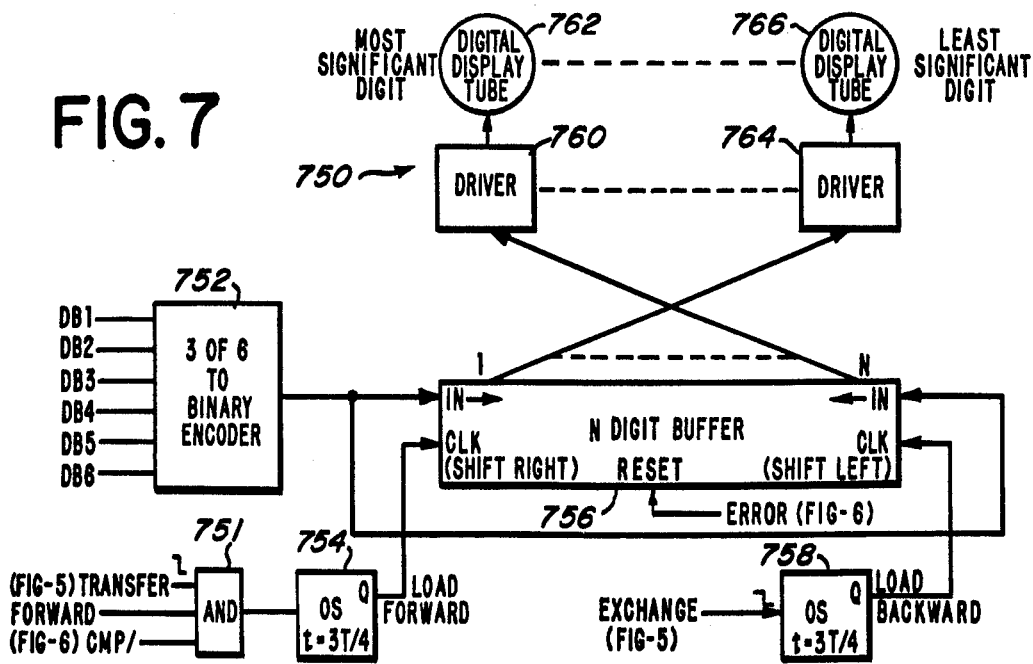
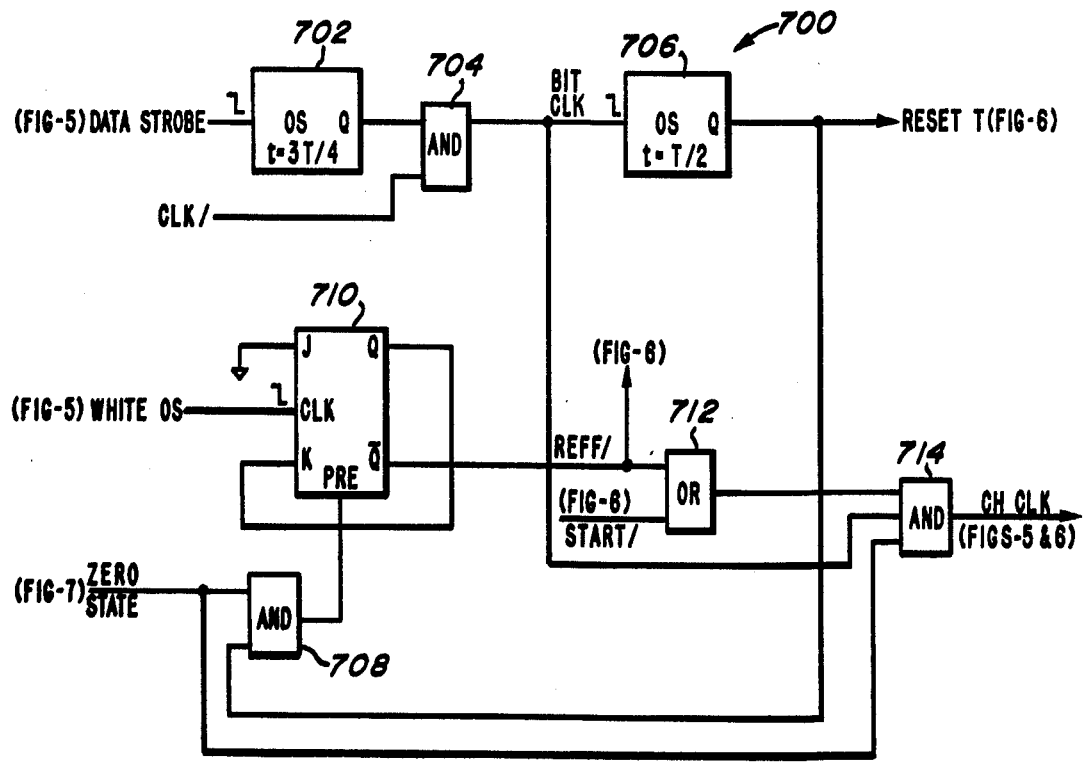

CODED RECORD AND METHOD OF AND SYSTEM FOR INTERPRETING THE RECORD

This is a continuation of application Ser. No. 104,955 filed Jan. 8, 1971 now abandoned.

This invention relates to machine readable codes and records and, more particularly, to a new and improved record, method of making the record, and a method of and a system for translating or interpreting the record.

The need for acquiring data at, for example, a point of sale is well recognized, and many attempts have been made in the past to provide records, tags, or labels and reading and interpreting systems that are capable of being used in retail stores at the point of sale and for inventory. In this application, the records must be easily and economically made and must be such that, for example, handling by customers does not deface the coding or render the code incapable of accurate reading. Further, the record should be such that it can be read either by a portable manually manipulated reader or a stationary machine reader of low cost. Further, when the record or label is to be read by a manual reader, it should be such that the record interpretation is as independent of speed and direction of reading as is possible.

Prior approaches to this problem have used sequential areas or bars of different light reflecting characteristics in which bit value is determined by color. These records are inexpensive to produce and require somewhat more elaborate reading systems than desirable. Other techniques provide codes in bar or stylized character form with magnetic or light reflecting recordings in which absolute values in a dimension such as width are assigned to the different binary weights or values. These codes can be read serially or in parallel. The parallel codes require plural transducers which cannot be easily accommodated in a portable reader, and the magnetic recordings also are not easily read with manual or portable readers. The sequential bars of varying width are easily read using a single transducer in a portable unit but require either extensive level detection equipment or individual width timers in the interpreting system which are not easily compensated for variations in the manually controlled speed of relative movement between the reader and the record.

Accordingly, one object of the present invention is to provide a new and improved coded record.

Another object is to provide a coded record using width modulated areas in which the width of the area is not assigned an absolute binary value but provides a binary value only by comparison with the width of an adjacent area.

A further object is to provide a method of making binary coded records by varying the relative widths of consecutive areas of different characteristics in accordance with data to be encoded on the record.

Another object is to provide a method of interpreting or translating records coded in areas of varying width by comparing the widths of successive areas and establishing bit values in dependence on their relative widths.

A further object is to provide a system for reading records coded in areas of varying width including means for storing the widths of adjacent areas, means for comparing the stored widths, and means for assigning different bit weights or values in dependence on the determined relative widths.

In accordance with these and many other objects, an embodiment of the present invention comprises a record, tag, or label made, for example, of a member having a light reflective surface on which are recorded a plurality of nonreflecting bars. The widths of the nonreflecting bars and the reflecting bars disposed between and defined by the nonreflecting bars are modulated in width so that, for example, when the width of any one bar, either reflective or nonreflective, is greater than the width of the preceding bar, a binary "1" is encoded. A binary "0" is encoded whenever the width of any given bar, either reflective or nonreflective, is less than the width of the immediately preceding bar. These records can be easily produced using nothing more than conventional paper or card stock and simple coding elements either individual or in sequence for applying ink or other nonreflective material to the record. The record making apparatus can be such as to sequentially or concurrently record a plural character message, each character comprising a plurality of bits with the message preceded and followed by start and stop codes coded in the same manner as the characters of the message.

This record is interpreted by a manually held light pen including, for example, a light source for directing light onto the record and a light responsive element providing a varying output in dependence on the quantity of reflected light received from the record, although this reading assembly could as well be incorporated into a stationary record reading mechanism. The record is read by producing relative movement between the reader and the record in either a forward or backward direction requiring only that the reader pass across the entire coded message at some point along its length. The analog signal developed by the photoresponsive unit in the reader is digitized into a two-level signal representing white or black and, in dependence on the level and length of this signal, gates a free running clock into one of two counters so that at the end of two bars, either white or black, the two counters store representations of the widths of the two bars. The outputs of the counters are connected to a comparator circuit which determines the relative widths of the two bars and shifts a binary "1" or "0" into the first stage of a shift register in dependence thereon. The next transition from the reader clears one of the counters to read the next bar width into this counter, and the width of this bar is compared with the width of the previous bar which remained in storage to determine the relative widths of these two bars and to shift a binary "1" or "0" into the shift register. The other of the counters is then cleared, and the width of the next bar is stored. This continues until such time as a start code is recognized when the record is read in the forward direction or a stop code is recognized when the record is being read in a backwards or reverse direction.

More specifically, a signal source continuously reads out the contents of the shift register to a start-stop decoder as each bit is shifted into the shift register. This continues until such time as either a start or a stop code is recognized. At this time, the decoder set a storage element indicating whether the record is being read in the forward or reverse direction and shifts the mode of operation of the interpreting circuit from a scanning mode of operation to reading mode.

The next plural bit character is then read into the storage register in the manner described above using the counters and the comparator. When all of the bits of the first character of the message have been shifted into the shift register, the contents of the shift register are clocked or read out to a utilization device such as a lamp display or the input of a data processor, if the record is being read in a forward direction. If the data is being read in a reverse direction, the contents of the shift register are reversed in order, complemented, and then read out to the display or data processor. The remaining characters of the message are processed in this manner until such time as the start or stop code is detected, depending on the direction of reading. At this time, the decoding circuit returns the interpreting system from the read mode to the scan mode in preparation for reading the next message.

It should be noted that since the system is capable of correctly interpreting records read in either a forward or reverse direction, a record or label containing a plurality of messages can be scanned in any sequence or order, and the results are correctly interpreted and forwarded to display or the input to the data processor unit.

Many other objects and advantages of the present invention will become apparent from considering the following detailed description in conjunction with the drawings in which:

FIG. 5 is a schematic diagram in block logic form illustrating the basic data flow in a record translating system embodying the present invention;

FIG. 7 is a logical block diagram illustrating timing and display circuits provided in the record translating circuit.

Figure 1:
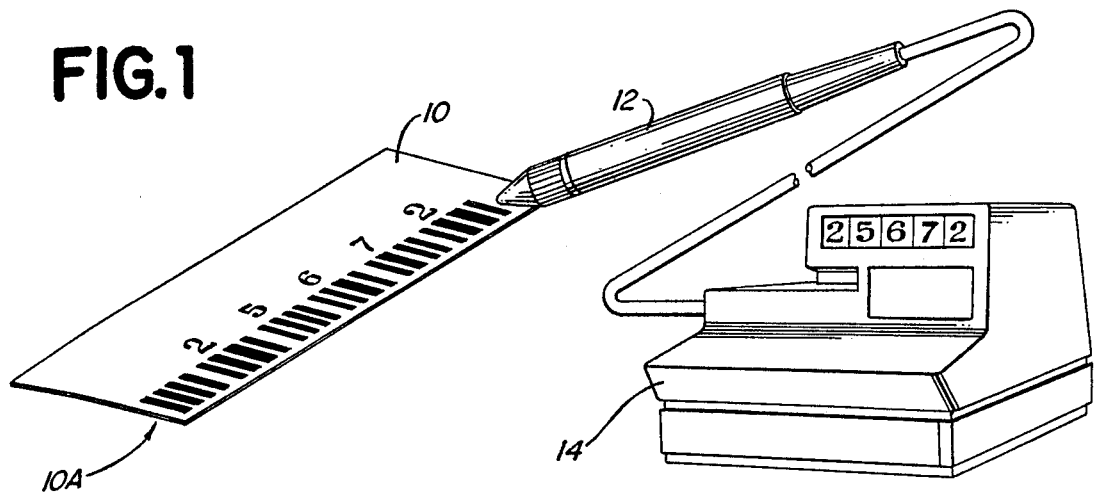
FIG. 1 is a schematic diagram illustrating a record embodying the present invention in conjunction with a reader and interpreting circuit therefor.

Referring now more specifically to FIG. 1 of the drawings, therein is illustrated a record 10 embodying the present invention which is capable of being read or interpreted by a manual or portable reader 12, the output of which is coupled to a record translating or interpreting system 14 embodying the present invention. In the illustration of FIG. 1, an edge portion 10A of the record, tag, or label 10 is provided with a plural digit or character message preceded by a start code and followed by a stop code (not shown), all encoded in binary form in accordance with the present invention. As illustrated, the digit or character can be recorded in a character or visually recognizable form. As illustrated in FIG. 1, the message comprises five numerical digits "25672", although the message could include any variable number of digits recorded in any position on the record 10.

Figure 2:
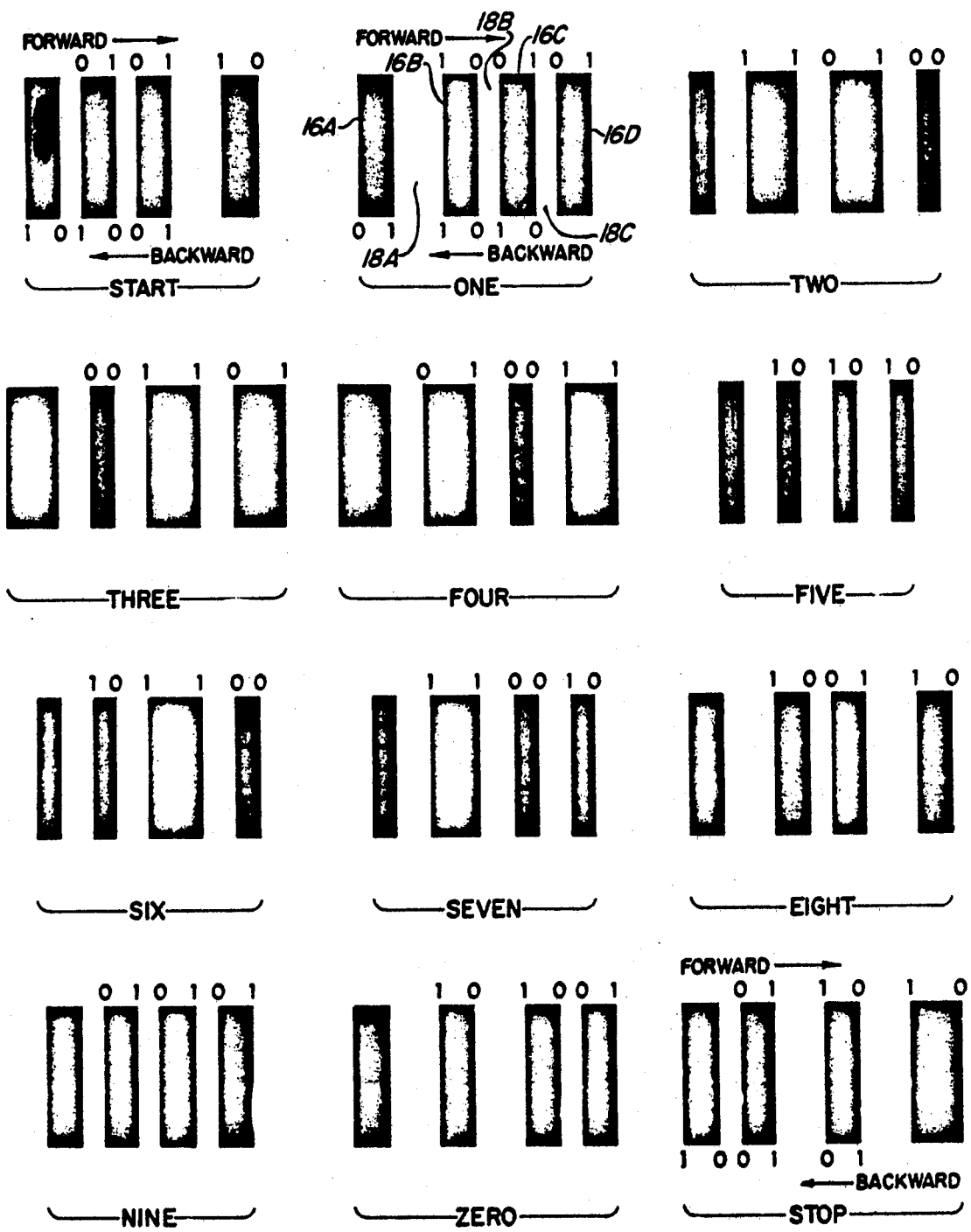
FIG. 2 is a schematic illustration of one set of codes for the digits "1-9", "0", start, and stop embodying the present invention.

FIG. 2 of the drawings illustrates one set of codes embodying the present invention which provides a 3 of 6 code using four bars or areas 16A-16D defining three intervening areas or bars 18A-18C of a different characteristic. In a preferred embodiment, the bars 16A-16D are formed by printing a substantially nonreflective material, such as black ink, on the reflective surface of the record 10 so that the areas or bars 18A-18C comprise the light reflective surface of the record. The different characteristics of the bars 16A-16D and 18A-18C could also be defined by the use of different materials, such as the presence or absence of magnetic material or materials of sufficiently different light reflecting characteristics.

The widths of the bars 16 and 18 is selectively varied or modulated to encode binary "1" and "0" information. By using four bars in a 3 of 6 code, each of the bars 16 and 18 can have one of three different widths, and in a preferred embodiment, these widths can comprise 12, 18, and 27 units, respectively, which have been found to provide a more than adequate differentiation on interpretation using the reader 12 and the translating system 14. In general, the differentiation between widths on reading can be increased by increasing the difference between the narrow, middle, and wide widths with an accompanying loss of bit density or packing on the record. On the other hand, the difference in width between the narrowest width and the widest width can be reduced to increase bit density or packing with the result that differentiation between widths on interpreting becomes somewhat more difficult.

To illustrate the width coding embodying the present invention using the code for the digit one, the code assigned to this digit reading left to right is "100101", as illustrated immediately above the bars 16 and 18 in FIG. 2. Thus, the first nonreflective bar 16A is assigned a middle width, and the following reflective bar or area 18A is assigned the widest width. On interpretation, the width of the bar 18A is compared with the width of the bar 16A and found to be greater, and the system 14 recognizes this greater than relationship as denoting a binary "1" value. During record interpretation the width of the nonreflective or dark bar 16A is discarded and replaced by the width of the bar 16B as relative movement is produced by the record 10 and the reader 12. The bar 16B has a middle width which is less than the wide width of the bar 18A. The system 14 recognizes this less than relation as representing a binary "0". Since the next binary value in the code for the digit one is a binary "0", the next bar 18A is assigned the narrowest width so that when the width of this bar is compared with the middle width of the bar 16B, a less than relationship is again established to encode the binary "0". To encode the next binary "1" in the code for the digit one, the bar 16C is made of a middle width, and when compared with the narrow width of the bar 18B results in a binary "1". Similarly, the next reflective bar 18C is made of a narrow width and compared with the wider middle width of the bar 18C to result in a binary "0". The final nonreflective bar 16D is made of the middle width, which, compared with the narrow width of the bar 18C, results in a binary "1". Thus, the width modulation of the bars 16 and 18 when read in a forward direction results in the assigned 3 of 6 code "100101".

As set forth above, the message information on the record 10 provided by the code such as the code occupying the portion 10A of the record 10 can be read in either a forward or a backward direction. Obviously, when the code is read in a reverse or backward direction, the binary significance of the width modulated bars is changed, and a correct code for the digit may not be provided. This is illustrated in the coded representation of digit one in FIG. 2. The binary digits appearing adjacent the lower edges of the bars indicate that when this code is read in a reverse or backward direction as shown by the arrow, the input from the reader 12 to the system 14 considered in the direction of scanning is "010110". If this entry is reversed in order to "011010" and complemented, the code "100101" results. Thus, any width modulated code read in a backward or reverse direction can be converted to a true code by inverting and complementing the results obtained by reading the code in a reverse or backward direction.

Figure 3:
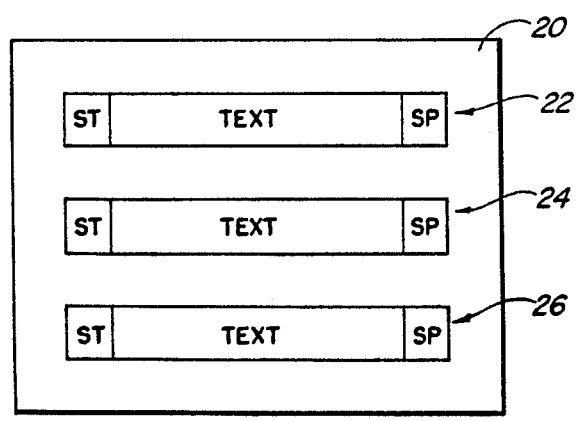
FIG. 3 is a plan view of a label or record embodying the present invention.

FIG. 3 illustrates a record 20 embodying the present invention containing three separate messages 22, 24, and 26 printed in parallel, spaced relation on the record 20. Each of the messages 22, 24, 26 is preceded by a start code as shown in FIG. 2 followed by a plural digit message, each consisting of a plurality of bits encoded in accordance with the code illustrated in FIG. 2. Each of these messages is terminated by a stop code. The messages 22, 24, and 26 on the record 20 can be read all in a forward direction or all in a reverse direction, or in any intermixing of forward and reverse directions. The only requirement that must be met for correct interpretation of the record 20 and the messages 22, 24, and 26 thereof is that the relative movement between the record 20 and the reader 12 is such that each of the bars in the codes of the message passes by the reader 12.

Figure 6:
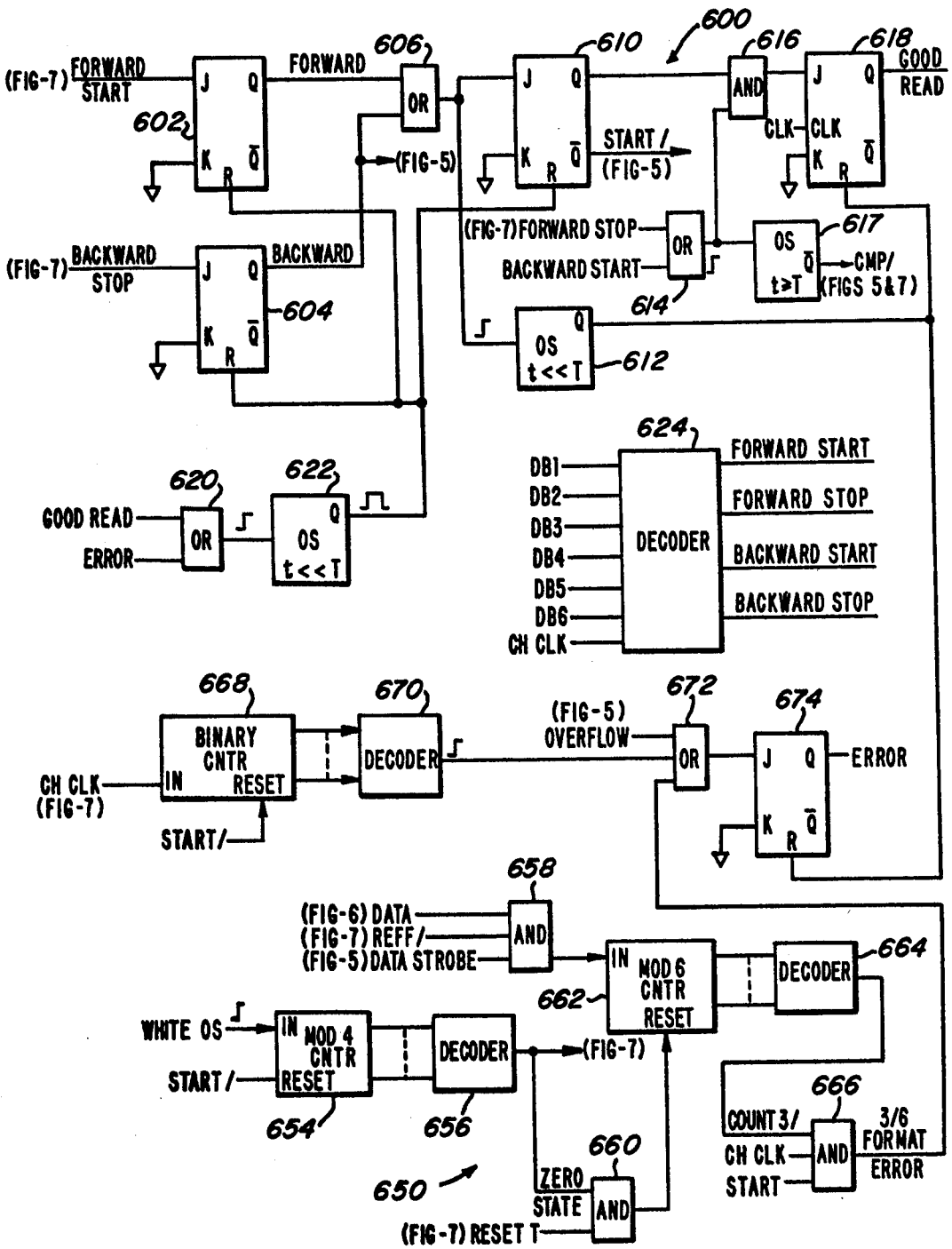
FIG. 6 is a logic block diagram of circuits included in the record translating system of the present invention providing forward and reverse detecting controls and error controls.

Referring now more specifically to the logic block diagrams of FIGS. 5-7, these circuits comprise the record interpreting system 14 and are shown in simplified form in AND and OR logic. Although the system 14 is illustrated in FIGS. 5-7 in this simplified form to facilitate an understanding of the invention, an embodiment of the system 14 has been constructed in NAND and NOR logic using series 55/74 TTL logic elements manufactured and sold by Texas Instruments Incorporated of Dallas, Texas. The conversion of the illustrated AND and OR logic elements to TTL logic is well within the expected skill of a designer familar with digital logic.

Referring now more specifically to FIGS. 5-7 of the drawings, a data interpreting circuit 500 is illustrated in FIG. 5 and a sequence or status control circuit 600 which places the system 14 in either a scan mode to look for a start indication or a read mode to read message data is illustrated in FIG. 6. FIG. 6 also illustrates an error checking or detecting circuit 650 which provides an error indication whenever a received character is not provided in the desired 3 of 6 code or when the message includes more than a maximum number of characters or when the width of any area exceeds a given maximum limit. A timing circuit 700 (FIG. 7) provides certain basic timing signals used to control the operation of the system 14, and a data utilization means or display means 750 is also illustrated in FIG. 7.

When the system 14 is not actually engaged in translating a record 10, this system is in a scan mode searching for either a stop code read in a backwards or reverse direction or a start code read in a forward direction. On detection of one of these codes, the system 14 is set into its read mode to translate the data from the record 10. This status of the system 14 is basically established by a start flip-flop 610 which is set to its reset condition either by an error or the completion of the satisfactory reading of a message. In its reset condition, a start signal START is at a low or "0" level, and an inverted start signal START/ is at a high or "1" level. Throughout the drawings, an inverted signal is indicated by a "/" following the signal designation. The signal START/ is used among other purposes to reset a binary counter 668 which controls the production of an indication that an excess number of characters has been received and to reset a modulo four counter 654 which is used to count the number of bits in a complete character. When the modulo four counter 654 is reset, a decoder 656 coupled to its output supplies a high level signal ZERO STATE which indicates that the character counter 654 is reset. The counter 654 selects complete characters, and the counter 668 forms a part of the error detecting circuit 650.

Figure 4:
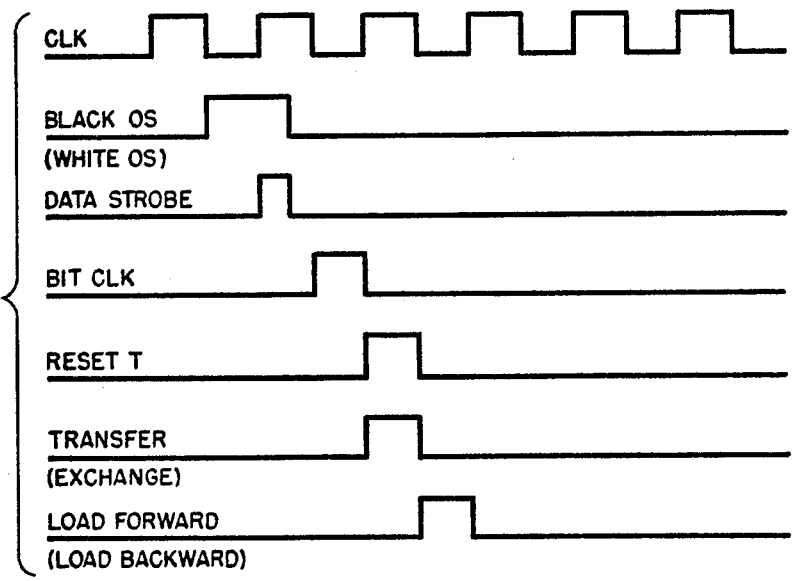
FIG. 4 is a table illustrating timing and control signals used in the translating or interpreting circuit of the present invention.

The operations of the system 14 are synchronized or clocked by an oscillator 502 which provides an output clock signal CLK and an inverted clock signal CLK/ through an inverter 504. The clock period provided by the oscillator 502 can be of any suitable value such as 80 KHZ which is schematically represented in the drawings as having a period "T". The waveform of the clock signal CLK is shown in the first line of FIG. 4.

The input to the system 14 is provided by the reader 12 (FIG. 1), the output of which is coupled to the input of an analog-to-digital converter 506 which provides a high level signal to the D input of a D type flip-flop 508 representing a black or nonreflective bar 16 and a low level signal representing a white bar or area 18. The construction of the light pen or reader 12 can be of any of a number of types well known in the art such as those shown, for example, in U.S. Pat. No. 3,509,353 or French Pat. No. 1,323,278. Further, the analog-to-digital converter 506 can comprise any one of a number of such circuits that are well known in the art and, for example, can comprise a differential amplifier with wave shaping and level control.

Assuming that the system 14 is in a scan mode and that a message on a record 10, 20 is to be read in a forward direction, relative movement is produced between the reader 12 and the record 10, 20 so that the reader or light pen 12 first reaches the first black bar 16 in the start code. At this time, the output of the unit 506 rises to a high level, and the flip-flop 508 is set on the next occurring clock pulse CLK. The "Q" output of the flip-flop 508 rises to a more positive level to provide a black signal BLACK. This signal triggers a one-shot 510 to provide a positive-going output signal BLACK OS whose duration is approximately three-quarters of the length of the clock period (see line 2 in FIG. 4). This signal is applied in turn to another one-shot 524, and the trailing edge of the signal BLACK OS triggers the one-shot 524 to provide a positive-going signal through an OR gate 526 to reset a binary counter 530 in which is stored the width or a representation of the width of the black bars or areas 16.

Thus, the counter 530 is now cleared. In the logic diagrams, the approximate durations of the output signals from the monostable circuits relative to the clock period are indicated in the rectangular symbol for the one-shot.

The clock period is very, very short compared with the duration of the output signal BLACK from the flip-flop 508. This signal is also applied to one input of an AND gate 528, the other input of which is supplied with the clock signal CLK. The output of the gate 528 is connected to the counting input of the binary counter 530. Accordingly, following the resetting of this counter, the clock pulses CLK advance the setting of the binary counter 530 during the duration of the signal BLACK.

Accordingly, when the reader reaches the end of the first black bar 16 in the start code and enters the reflective area of the first reflective bar 18, the level of the output from the unit 506 drops to a low level, and on the next clock pulse the flip-flop 508 is reset so that the signal BLACK drops to a low level and a white level output signal WHITE rises to a high or "1" level. The termination of the signal BLACK inhibits the gate 528 so that the binary counter 530 now stands in a setting representing the duration of the first black bar 16 in the start code.

The signal WHITE triggers a one-shot 512 similar to the one-shot 510 to provide an output signal WHITE OS (see line 2 in FIG. 4) which is applied to the input of another one-shot or monostable circuit 538. The brief positive-going pulse at the output of the one-shot 538 is coupled through an OR gate 540 to reset a binary counter 534 in which is stored the duration or a representation of the duration of the white reflective bars or areas 18. Thus, the counter 534 is reset to a normal condition.

The output signal WHITE from the flip-flop 508 is also applied to one input of an AND gate 536, the output of which is coupled to a counting input of the binary counter 534. The other input to the AND gate 536 is supplied with the clock signals CLK. Thus, the counter 534 is now advanced to a setting representing the duration of the first white area or bar 18 in the start code. When the reader 12 reaches the end of the first white area 18 in the start code and enters the second black bar 16 in this code, the flip-flop 508 is toggled on the clock signal CLK so that the signal BLACK rises to a high level and the signal WHITE drops to a low level. This inhibits the gate 536 so that the counter 534 can no longer be advanced, and the value set into this counter represents the width of the first white bar. The circuit 500 now performs the first width comparison to determine whether the first pair of successive bars in the start code represent a binary "1" or a binary "0".

More specifically, this comparison or bit value determination is performed by a full adder 532 and an exclusive OR gate 548. The "1" or "0" outputs of the black counter 530 are coupled to the corresponding inputs of the full adder 532, and the "0" or "Q" outputs of the white counter 534 are coupled to the other set of inputs to the full adder 532. The most significant carry output from the full adder 532 is coupled to one input of the exclusive OR gate 548. The other input to the exclusive OR gate 548 is supplied with the signal BLACK. Since the full adder is provided with the value standing in the black counter and the "1"s complement of the value standing in the white counter 534, the full adder 532 effectively subtracts the values standing in the counters 530 and 534. This means that the full adder 532 will supply a high level or "1" carry to one input of the exclusive OR gate 548 when the value standing in the black counter 530 exceeds the value standing in the white counter 534. Conversely, when the value standing in the white counter 534 exceeds the value standing in the black counter 530, the carry is consumed in the full adder 532, and the coupled input to the exclusive OR gate 534 remains at its low or "0" level. It will be appreciated that a true subtraction can be performed by the full adder 532 only when a "2"s complement is supplied from the white counter 534 to the corresponding inputs of the full adder 532. However, because of the large differences in the binary counters 530 and 534 resulting from the use of the clock pulses and the margins between the widths of the bars 16 and 18, the error of "−1" arising from the use of the "1"s, as contrasted with the "2"s complement, is not significant.

Accordingly, one input to the exclusive OR gate 548 receives a high level or "1" signal when the black bar is wider than the white bar, and a low level or "0" signal when the white bar is greater than the black bar. The other input to the exclusive OR gate 548 is used to denote the sequence of comparison. More specifically, a high level or "1" input will be supplied to the upper input of the exclusive OR gate 548 on a transition from a white or reflective bar 18 to a nonreflective or dark bar 16. Conversely, a low level or "0" signal is applied to the upper input of the exclusive OR gate 548 on a transition from a nonreflective or dark bar 16 to a reflective or light bar 18. Thus, the truth table for the full adder 532 and the exclusive OR gate 548 can be expressed as follows:

1. on a transition from white to black, the upper input to gate 548 is high signifying that the width of the white bar just read into the counter 534 is being compared to the width of a prior black bar stored in the binary counter 530, then
   (a) the output of the gate 548 is low or "0" if the width of the black bar is greater than the width of the white bar because the carry out of the full adder 532 is "1";
   (b) the output of the gate 548 is "1" or at a high level if the width of the white bar is greater than the width of the black bar because the carry from the full adder 532 is at a low level or "0";
2. on a transition from black to white, the upper input to gate 548 is low signifying that the width of the black bar just read into the counter 530 is being compared to the width of a prior white bar stored in the binary counter 534, then
   (a) the output of the gate 548 is high or "1", if the width of the black bar is greater than the width of the white bar because the carry out of the full adder 532 is "1";
   (b) the output of the gate 548 is "0" or at a low level if the width of the white bar is greater than the width of the black bar because the carry from the full adder 532 is at a low level or "0".

Returning now to the circuit 500, the width of the first black bar in the start code is stored in the black counter 530 and the width of the following first white or reflective bar in the start code is stored in the binary counter 534. This storage was terminated by the setting of the flip-flop 508 as described above so that the signal BLACK rises to a high level. Since the width or value of the black bar stored in the counter 530 is greater than the width or value of the white bar stored in the white counter 534, there is a "1" carry out of the full adder 532, and the upper input of the exclusive OR gate 548 is also at a high level because of the signal BLACK. Accordingly, the output of the exclusive OR gate 548 drops to a low level and is applied to one input of an AND gate 550, the output of which supplies a data signal DATA and is coupled to the serial input of a data buffer 522. The other input to the AND gate 550 is held at a high level at the output of a monostable circuit 554. Accordingly, a low level signal representing a "0" is applied to the serial input of the data buffer 522 representing translation of the comparative widths of the first two bars in the start code.

The data buffer 522 is of a known construction and can comprise, for example, in TTL logic, a pair of SN7495 data buffers produced by Texas Instruments Incorporated. This data buffer includes a pair of clock inputs designated as clock 1 and clock 2 which are selectively rendered effective under the control of the level of the signals applied to a mode input terminal. When the level of the signal applied to the mode input is at a low or "0" level, the normal condition, a positive-going signal applied to the clock 1 input shifts the value provided at the serial in terminal into the first stage of a six stage shift register. This output appears at an output terminal A to provide an output signal DB1. The outputs of the remaining five stages of the shift register appear at terminals B-F on the right-hand edge of the logic block for the buffer 522 and provide corresponding output signals DB2-DB6.

The data buffer 522 also provides inverted outputs DB1/-DB6/ which are returned to a set of six parallel inputs to the six stages of the shift register in the data buffer 522. These input terminals are designated A-F adjacent the left side of the logic block for the data buffer 522. As illustrated in FIG. 5, the inverted or complemented output of the sixth stage DB6/ is applied to the parallel input of the first stage at the terminal A. The remaining inverted or complemented outputs of the shift register are similarly returned in inverted or center-folded order to the remaining parallel inputs B-F. The parallel input to the data buffer 522 is controlled by signals applied to the clock 2 input whenever the level of the signal applied to the mode input of the data buffer 522 is at a high level.

As set forth above, the level of the signal applied to the mode input of the buffer 522 is at a low level, and a low level signal representing a binary "0" is also applied to the serial input of the data buffer 522 from the AND gate 550 as a result of the above-described comparison. This comparison was initiated, as described above, by placing the signal BLACK at a high level. This again triggers the monostable circuit 510 to provide a more positive output which is forwarded through an OR gate 514 to one input of an AND gate 516, the other input of which is supplied with the clock signal CLK. When the signal CLK next goes positive, the gate 516 is fully enabled and provides a more positive signal at its output which is forwarded through an OR gate 520 to provide a data strobe signal DATA STROBE to the clock 1 input of the data buffer 522 (see lines 1, 2, and 3 in FIG. 4). The positive-going signal at the clock 1 input to the buffer reads the "0" from the serial input into the first stage of the shift register. Thus, the first bit of the stop code is now stored in the data buffer 522.

The signal BLACK OS in addition to enabling the generation of the data strobe signal is also effective through the monostable circuit 524 and the OR gate 526 to reset the binary counter 530. This resetting occurs on the trailing edge of the signal BLACK OS so that the resetting of the counter 530 does not interfere with the previously described comparison by the full adder 532. Further, since the signal BLACK is at a high level, the gate 528 is enabled, and the width of the second black bar in the start code is read into the black counter 530 using the clock signals CLK. At the end of the scanning of the second black bar 16 in the start code, a clock signal CLK switches the flip-flop 508 so that the signal BLACK drops to a low level and the signal WHITE rises to a high level. This inhibits the input to the black counter 530 and initiates the next bar width comparison.

As illustrated in FIG. 2, the width of the second black bar 16 in the start code is greater than the width of the preceding white bar. Thus, the value now standing in the binary counter 530 is again greater than the value of the white bar previously stored in the white counter 534. Thus, the full adder 532 provides a more positive output to one input of the exclusive OR gate 548. However, the signal BLACK is at a low level indicating that the reader has passed through a black or nonreflective bar and has entered into a light or reflective bar. Thus, a low level signal is applied to the upper input of the exclusive OR gate 548, and the output of this gate rises to a more positive level. Thus, the AND gate 550 is fully enabled, and a more positive signal is applied to the serial in terminal of the data buffer 522. This bit is shifted into the first stage of the shift register in the data buffer 552, and the previously stored "0" is shifted to the second stage under the control of the data strobe signal DATA STROBE. More specifically, the output of the monostable circuit 512 which is triggered by the positive-going edge of the signal WHITE is effective through the gates 514, 516, and 520 to provide a data strobe signal which enters a "1" into the first stage of the shift register and shifts the previously entered "0" to the second stage of the shift register. Thus, the first two bits of the start code are now stored in the data buffer 522.

The high level signal WHITE OS is also effective in the manner described above through the monostable circuit 538 and the gate 540 to clear the WHITE counter 534 of the value of the first white bar in the start code. Further, since the signal WHITE is at a high level, the gate 536 is enabled, and the value of the second white bar 18 in the start code is now read into the white counter 534 under the control of the clock signal CLK in the manner described above.

The remaining four bits of the six bit start code are shifted into the data buffer 522 under the control of the counters 530 and 534, the full adder 532, the exclusive OR gate 548, and the AND gate 550 in the manner described above. At the completion of this operation, the data buffer 522 contains all of the bits of the start code read in a forward direction, and the output signals DB1-DB6 from the data buffer 522 represent the start code "010110". These signals are supplied to the corresponding designated inputs of a decoder 624 in the sequence control circuit 600, and this decoder is effective to change the status of the start flip-flop 610 so that the system 14 is changed from its scan mode of operation to a read mode of operation in which the following message material is interpreted. In fact, during the scan mode, as contrasted with the read mode, the decoder 624 is enabled to read the contents of the data buffer 522 as each bit of information is shifted into this buffer so that the system 14 in its scan mode effectively continuously monitors input data looking for a proper start code.

This is controlled in part by the timing circuit 700 (FIG. 7). Each time that a data strobe signal DATA STROBE is generated incident to clocking a bit into the data buffer 522, the trailing edge of this signal sets a monostable circuit to provide a positive-going signal of the duration indicated in the symbol. During the following inverted clock signal CLK/, a data 704 is fully enabled to generate a bit clock signal BIT CLOCK which is applied to one input of an AND gate 714. Another input to this gate is supplied with a continuous more positive signal from an OR gate 712, one input to which is provided with the signal START/ indicating that the system 14 is in a scan mode. The other input to the gate 714 is supplied with the signal ZERO STATE. As set forth above, this signal remains in a more positive level so long as the character counter 654 in the error detection circuit 650 remains in a reset state. Thus, the AND gate 714 provides a character clock signal CH CLK which is coincident with and of the same duration as the bit clock signal BIT CLK (see line 4 in FIG. 4). Thus, a character clock signal CH CLK is generated for each data strobe signal.

The signal CH CLK is applied to an enable input to the decoder 624 so that this decoder examines the contents of the data buffer 522 as each data bit is strobed into the shift register. Accordingly, whenever a proper start code read in a forward direction is shifted into the data buffer 522 and the signal CH CLK appears, the decoder 624 provides a more positive signal FORWARD START.

This signal is applied to the indicated J input of a flip-flop 602 in the sequence control circuit 600. The flip-flop 602 is a toggle, i.e., asynchronous JK, flip-flop and is set so that a more positive signal is provided from its "Q" output terminal through an OR gate 606 to the J input terminal of a start flip-flop 610. This toggles the flip-flop 610 so that the signal START becomes more positive and the inverted signal START/ drops to a low level. This removes the reset signal from the character counter 656 (FIG. 6). The output of the gate 606 also triggers a monostable circuit 612 to provide a positive-going pulse of the indicated duration which resets a good read flip-flop 618 and an error flip-flop 674.

This setting of the start flip-flop 610 converts the system 14 from its scanning mode to its reading mode. One function accomplished by this transition is the termination of the enabling of the decoder 624 each time that a bit is read into the data buffer 522. This is accomplished through the control of the OR gate 712 in the timing circuit 700. More specifically, the signal START/ drops to a low level and removes one possible enabling signal from the gate 712. The character clock signal CH CLK is now generated following the receipt of each six valid data bits defining a true message character by the data buffer 522. The character clock signal CH CLK is now used not only for the periodic enabling of the decoder 624, but also to transfer data from the data buffer 522 into the data utilization means or display means 750 as each complete character of the message is decoded and received.

As noted above, the character clock signal CH CLK is generated during the reading mode following the receipt of six valid data bits which completely define a true message character by the data buffer. From considering the codes shown in FIG. 2, it can be seen that for the character codes as well as the start code, the six valid bits completely defining a single character result from the above-described comparisons of the first black bar and the first white bar and the following three black bars and two white bars. Since the comparison circuitry shown in FIG. 5 also can respond to the white bar separating successive codes and the first black bar in the code, eight bits of information can be generated incident to reading each character code. The first two bits are superfluous and result from comparing the white bar separating codes to both the last black bar in the preceding code and the first black bar in the following code. The next six bits are significant and are generated using the bars set forth above in the description of the decoding of the start character. The system 14 is so arranged that these two superfluous bits are in fact generated, but are shifted through a shift register in the data buffer ahead of the six following significant bits. The error detecting circuit 650 and the timing circuit 700 cooperate to permit the two extraneous bits to be shifted through the buffer 522 so that the contents of the data buffer 522 are transferred to the data utilization means or display means 750 only when the six significant bits defining the message character are present in the shift register of the data buffer 522.

More specifically and as set forth above, the setting of the start flip-flop 610 drops the signal START/ to a low level and removes one possible enabling signal for the OR gate 712 which in turn controls the enabling of the upper input to the character clock AND gate 714. The other input to the OR gate 712 is coupled to the "$\overline{Q}$" terminal of a flip-flop 710. In the scan mode of the system 14, the signal ZERO STATE is in its high level to enable one input to an AND gate 708, the output of which is coupled to a preset terminal of the flip-flop 710. The other input to the AND gate 708 is coupled to the output of a monostable circuit 706 which is triggered on the trailing edge of the bit clock signal BIT CLK. As set forth above, this signal is effective through the AND gate 714 to generate the signal CH CLK. Accordingly, after the disappearance of the signal CH CLK resulting in the setting of the start flip-flop 610 when the reader enters the white area or bar following the start code, the monostable circuit 706 provides the signal RESET T which completes the enabling of the AND gate 708 so that a more positive signal is applied to the preset terminal of the flip-flop 710. This places this flip-flop in a condition in which the "Q" terminal is high, and the "$\overline{Q}$" terminal is low.

At the end of the white bar separating the start code from the first message character code, for example, the code for the numerical character "1" shown in FIG. 2, the leading black bar 16A is encountered by the reader, and a comparison is made between the width of this white area or space between codes now stored in the counter 534 and the width of the last black bar in the start code now stored in the binary counter 530. This generally results in the entry of a binary "1" by the gate 550 into the first stage of the shift register in the data buffer 522. It also results in the signals DATA STROBE, BIT CLK, and RESET T shown in FIG. 4. Since the OR gate 712 applies an inhibit to the upper input of the gate 714, a character clock signal CH CLK is not generated, and another pulse is applied by the AND gate 708 to again prime the flip-flop 710 to its preset condition under the control of the signal RESET T.

As the reader moves beyond the first black bar 16A in the first message code for the character "1", the value of the initial black bar is stored in the black counter 530 and a comparison is made in the manner described above with the value stored in the white counter 534 which now represents the space between codes. This results in a second superfluous bit being entered into the data buffer 522 through the AND gate 550 and the shifting of the first superfluous bit into the second stage of the shift register in this data buffer. It also results in the generation of the signals shown in lines 2–4 of FIG. 4, but a character clock signal CH CLK is once again not generated because of the absence of a more positive output from the OR gate 712. The generation of the signal WHITE OS does, however, condition the system 14 to operate in its read mode to start the reading of the first character in the encoded message.

More specifically, with the signal START/ now at a low level, the continuous reset signal is removed from the modulo four counter 654, and the leading edge of the signal WHITE OS advances the counter 654 to its first setting. This setting of the counter 654 is effective through the decoder 656 to place the signal ZERO STATE at a low level. This applies an inhibit to the upper input of the AND gate 708 in the timing circuit 700 and prevents the application of further preset signals to the flip-flop 710. Thus, when the trailing edge of the signal WHITE OS is reached, the flip-flop 710 is clocked so that the "Q" terminal drops to "0" or a low level potential which is applied to the K input of this flip-flop, and the "$\overline{Q}$" terminal rises to a more positive potential so that the upper input to the AND gate 714 is now enabled. Since, however, the signal ZERO STATE is at a low level, an inhibit is applied to the lower input to the AND gate 714, and the following signal BIT CLK cannot generate the character clock signal CH CLK. Since low level signals are now applied to both of the J and K inputs to the flip-flop 710, its status cannot be changed by further signals WHITE OS. Thus, the high level signal REFF/ derived from the "$\overline{Q}$" terminal of the flip-flop 710 remains until the flip-flop 710 is next preset at the end of the character.

When the reader now reaches the end of the first white bar 18A in the code for the numerical character "1", the components 530, 532, 534, 548, and 550 shift the first valid bit, in this case a binary "1", into the first stage of the shift register of the data buffer 522 in the manner described above, and the superfluous two preceding bits are shifted along in the register.

In the circuit 500, the reading of the bars 16B, 18B, 16C, 18C, and 16D by the reader 12 operates in the manner described above to shift, considered from left to right, the bits "00101" into the shift register in the data buffer 522. During this operation, the two superfluous bits referred to above are shifted out of the end of the six stage shift register. Accordingly, the data buffer 522 now contains a complete and correct code for the numerical character "1".

During this reading operation, the modulo four counter 654 has been advanced through its second and third settings by the signals WHITE OS developed by the white areas 18B and 18C and has been shifted back to its initial or zero setting by the signal WHITE OS developed by the reader reaching the white space following the complete code for the numerical character "1". This return of the modulo four counter 654 is effective through the decoder 656 to place the signal ZERO STATE at a more positive level. This return of the signal ZERO STATE to a more positive level indicates to the system 14 that the six valid bits of a character code are now stored in the data buffer 522.

The trailing edge of the signal DATA STROBE again triggers the monostable circuit 702 and controls the AND gate 704 in conjunction with the signal CLK/ to develop the signal BIT CLK. Since the signal ZERO STATE is now at a more positive level, the AND gate 714 is fully enabled and the character clock signal CH CLK is generated. This signal transfers the contents of the data buffer 522 directly to the display or data utilization assembly 750 because the data record is being read in a forward direction, as set forth above.

More specifically, when the trailing edge of the signal CH CLK is reached, a monostable circuit 556 is triggered to provide a more positive output of the duration indicated in the symbol block for the circuit 556. This output signal TRANSFER is applied to one input of an AND gate 751 in the assembly 750, the other two inputs to which are supplied by the signals FORWARD and CMP. Since the record 10, 20 is being read in a forward direction, the signal FORWARD is positive, and the signal CMP is normally in a "1" or high level state except when the buffer 522 contains a code indicating the end of message. Accordingly, the output of the gate 751 provides a more positive signal with the same timing as the signal TRANSFER (see FIG. 4), the trailing edge of which triggers a monostable circuit 754. The monostable circuit 754 provides a signal LOAD FORWARD (see last line in FIG. 4) which is applied to a clock or shift right input to a "N" digit buffer 756. This buffer is arranged for parallel input of binary coded digits and has two input terminals coupled to the output of a 3 of 6 to binary encoder 752. The input to this encoder is supplied with the signals DB1–DB6 from the output of the data buffer 522. Accordingly, the 3 of 6 encoded character from the data buffer is encoded into true binary and applied to both input terminals of the shift register in the buffer 756. The signal LOAD FORWARD clocks or gates the first character into the first stage of the shift register. This character controls the energization of one of N drivers 760, 764 for N digital display tubes 762, 766. The first stage of the shift register is coupled to the driver 764 and the display tube 762 for the least significant digit. Thus, the least significant digit is stored in binary coded form in the digit buffer 756, and a visual display of this character is provided by the tube 766. Accordingly, the first character of the message has been decoded and transferred to the display or utilization means 750.

Referring back to the timing circuit 700, the generation of the character clock signal CH CLK coincides with the bit clock signal BIT CLK for each sixth significant bit, and the trailing edge of the signal BIT CLK again triggers the monostable circuit 706 to provide the signal RESET T. This signal, together with the high level signal ZERO STATE, combines with the signal RESET T to complete the enabling of the AND gate 708 so that the flip-flop 710 is primed to a preset condition in which the signal REFF/ is at a low level. The loss of the high level signal REFF/ places an inhibit on the gate 714 in place of the prior inhibit exercised by the low level signal ZERO STATE which is now at a high level.

The reader 12 is now moved relative to the code for the second character in the message. Incident to this movement, the flip-flop 710 is again clocked by the trailing edge of the signal WHITE OS occurring as the reader 12 enters the first white bar in the message code, and the modulo four character counter 654 is advanced from its normal or "0" setting to drop the signal ZERO STATE to a low level. The six bits defining the next character are translated by the circuit 500 in the manner described above, stored in the data buffer 522, and transferred through the encoder 752 into the digit buffer 756 under the control of the signals TRANSFER and LOAD FORWARD in the manner described above. As this second character is transferred into the buffer 756, the previously entered digit is shifted one stage to control the driver and digital display tube associated with the second stage, and the character just translated is now displayed on the tube 766 representing the least significant digit.

This operation continues until all of the characters of the message have been translated and transferred to the data utilization means or display means 750 in the manner described above. When the end of the message is reached and since the message on the record 10, 20 is being read in a forward direction, the reader 12 is next advanced over the stop code (FIG. 2) in a forward direction so that the bits, considered left to right, forming the stop code "011010" are now stored in the data buffer 522. The detection of this code by the decoder 624 indicates that the complete message has been translated and returns the system 14 from its reading mode to a scanning mode.

More specifically, when the character clock signal CH CLK is generated incident to the reader 12 reaching the white area at the end of the stop code, the decoder 624 is enabled at the leading edge of the signal CH CLK and translates the stop code stored in the buffer 522 to provide a more positive output signal FORWARD STOP. This signal is forwarded through an OR gate 614 to trigger a monostable circuit 617 to drive the signal CMP/to a low level for the period of time indicated in the logic block. The signal CMP/applies an inhibit to one input of the gate 751 so that the signal LOAD FORWARD cannot be developed, and there is no possibility of attempting to transfer the stop code through the encoder 752 into the digit buffer 756 in the display unit 750.

The more positive output from the OR gate 614 completes the enabling of the AND gate 616, and a more positive potential is applied to the J input terminal of a good read flip-flop 618. This flip-flop is a master-slave flip-flop. Accordingly, on the following clock signal CLK, the flip-flop 618 is set to provide a more positive signal GOOD READ. This signal is returned through an OR gate 620 so that its leading edge triggers a monostable circuit 622 to provide a positive-going reset signal of the duration indicated in the block for the circuit 622. This positive-going signal resets the forward flip-flop 602 as well as the start flip-flop 610. With the resetting of the flip-flops 602 and 610, the system 14 is returned to its scan mode in which, for example, the counter 654 is reset and a continuous enabling is provided for the upper input to the AND gate 714 through the OR gate 712 so that the character clock signal CH CLK is now generated as each bit is shifted into the data buffer 522. In addition, the data buffer 522 is cleared.

More specifically, when the signal START/ goes positive, the leading edge of this signal is effective through a gate 552 to trigger a monostable circuit 554 for the duration indicated in the logic block for the circuit 554 which is equal to or greater than six clock periods. When the monostable circuit 554 is set, the lower input to the AND gate 550 is inhibited so that only a binary "0" can be entered into the shift register in the data buffer 522. The monostable circuit 554 also provides a more positive signal CLEAR OS which is applied to the lower input of an AND gate 518. This enables the gate 518 so that six clock signals CLK can pass through this gate and the OR gate 520 to provide six signals DATA STROBE for clocking six binary "0"s into the shift register in the data buffer 522. In this manner, the data buffer 522 is cleared at the completion of the read operation. The digit buffer 756 containing the previously read message may either be cleared as by the actuation of a manual clear button (not shown) or may be cleared by shifting the next message into this buffer.

When a record or label 10, 20 is read in a reverse direction, the system 14 operates in substantially the same manner as described above, with the exception of the codes used to detect start and finish of message, and the manner in which the message stored in the buffer 522 is transferred to the data display unit 750. More specifically, as the reader 12 moves over the stop code which is the first code encountered when the message is read in a reverse direction, the bits "101001", when considered from right to left in FIG. 2, are stored in the data buffer 522. Since the character clock signal CH CLK is generated as each bit is shifted into the data buffer 522, this signal is effective to enable the decoder 624 when the complete reverse read stop code is stored in the buffer 522 to provide a more positive signal BACKWARD STOP. This signal sets a backward flip-flop 604 so that a more positive signal BACKWARD is forwarded through the OR gate 606 to set the start flip-flop 610. The leading edge of the more positive signal at the output of the OR gate 606 also places the monostable circuit 612 in operation so that the good read flip-flop 618 is reset as well as the error flip-flop 674. The setting of the start flip-flop 610 changes the system 14 from its scan mode to its read mode in the manner described above.

Assuming that the first character in the message read in the reverse order, i.e., the last character in the message read in the forward order, is "1", the data buffer is provided with the bits "010110", considered from right to left in FIG. 2, which bit message is not a correct code for character "1". Accordingly, the contents of the data buffer 522 must be reversed in order and complemented in the manner set forth above, and the contents of the buffer 522 must be transferred to the digit buffer 756 in the display unit 750 as the most significant, rather than the least significant, digit.

This control is achieved when the monostable circuit 556 is triggered by the trailing edge of the signal CH CLK to provide the more positive signal TRANSFER. This signal is not effective to generate the signal LOAD FORWARD previously used to shift the contents of the data buffer 522 into the data buffer 756 because the signal FORWARD is at a low level inhibiting the gate 751. The signal TRANSFER does, however, complete the enabling of a gate 558 whose other inputs comprise the more positive signals BACKWARD and CMP/. The more positive output from the gate 558 is applied to the mode input of the data buffer 522. Accordingly, on the next clock signal CLK applied to the clock 2 input to the data buffer 522, the contents of the shift register in the data buffer are reversed in order and complemented. Thus, the contents of the data buffer 522 now provide a correct code for the message character "1".

Since this character "1" is the last or least significant digit in the message, this character is to be shifted into the digit buffer 756 in the display unit 750 at the end of the buffer opposite from the end used when the message is read in the forward direction. More specifically, the more positive output from the gate 558 provides the signal EXCHANGE which is applied to the input of a monostable circuit 758 in the display assembly 750. The trailing edge of this signal triggers the circuit 758 to provide a more positive output signal LOAD BACKWARD of the duration indicated in the logic block for the circuit 758. This signal LOAD BACKWARD is applied to a shift left clock input to the digit buffer 756. Accordingly, the output of the 3 of 6 to binary encoder 752 is shifted into the last or Nth stage of the shift register in the buffer 756 and effects the illumination of the visual display 762 representing the most significant digit. As subsequent digits are shifted into the buffer 756, the digit shifts to the left so that when a complete message has been stored in the digit buffer 756, the first character entered controls the display 766 for the least significant digit.

The transfer of the remainder of the message to the display unit 750 takes place in the manner described above until such time as the start code which provides the termination of the message is encountered by the reader 12. At this time the bit message "100101" which is generated by scanning the start code in reverse or backward direction (see FIG. 2) is stored in the data buffer 522. The following character clock signal CH CLK enables the decoder 624 to provide a more positive signal BACKWARD START. This signal is applied to the OR gate 614 in the sequence control circuit 600.

The more positive signal BACKWARD START produces the same effect on the system 14 as previously described in conjunction with the signal FORWARD STOP. In other words, the transfer of the code from the data buffer 522 to the display unit 750 is inhibited by the clamp signal CMP/ at the gate 558, and the system 14 is changed from a reading mode to a scanning mode by the setting of the good read flip-flop 618 and the resetting of the start flip-flop 610 as well as, in this instance, the backward flip-flop 604. In this manner, a message on the record 10 or a sequence of messages 22, 24, 26 on the record 20 can be read in any order with the result that a correct display is provided by the unit 750.

The system 14 also includes a number of error checking means for preventing the transfer of invalid or improper data to the utilization means or display assembly 750. These errors include an excessive number of characters in the message, the storage of an excess width value in one of the counters 530, 534, and the receipt of a character code that is not in a proper 3 of 6 code.

More specifically, if either the black counter 530 or the white counter 534 is supplied with a width value exceeding the storage capacities of these counters or storage means, a more positive signal WHITE OVERFLOW or BLK OVERFLOW is provided. These two signals are supplied to the inputs of an OR gate 542 to set a toggle type flip-flop 546 so that a more positive signal OVERFLOW is provided. This signal is effective through the OR gates 526 and 540 to reset both of the counters 530 and 534. This signal is also applied to one input of an OR gate 672 in the error checking circuit 650 to set the toggle type error flip-flop 674. When the flip-flop 674 is set, a more positive error signal ERROR is provided. This signal resets the digit buffer 756 to terminate any visual display and is forwarded through an OR gate 620 to trigger the monostable circuit 622. The triggering of the monostable circuit 622 clears any set one of the flip-flops 602, 604, and 610 to automatically restore the system to a scan mode.

This requires the operator to again scan the message of the record 10, 20. When the first black or white bar is again encountered to generate either of the signals BLACK OS or WHITE OS, this signal is forwarded through an OR gate 544 to reset the overflow flip-flop 546. This completes the restoration of the circuit and frees the counters 530 and 534 to receive subsequent message or control information. When a start indication is received, either a forward start or a backward stop, one of the flip-flops 602 or 604 is set and is effective through the circuits 606 and 612 to reset the error flip-flop 674 and remove the reset from the buffer 756 in the display unit 750.

Another check made by the error detecting circuit 650 is for the receipt of a message containing an excess number of characters. The data utilization means or display means 750 is illustrated as being capable of accepting N characters or digits. If the message decoded by the reader 12 and the system 14 includes more than N characters, these additional characters would be lost. Accordingly, the error detecting circuit 650 includes a binary counter 668 having a counting capacity in excess of the maximum number of digits N accepted by the digit buffer 756 in the display assembly 750. The output of the binary counter 668 is coupled to the input of a decoder 670. This decoder supplies a more positive output whenever the input from the binary counter 668 indicates a total count of in excess of N.

The binary counter 668 includes a reset terminal supplied with the signal START/. As set forth above, this signal remains at a high or positive level so long as the system 14 is in the scan mode. Thus, the binary counter 668 is held in a reset condition during the scan mode. When, however, the system 14 is shifted into its read mode to translate and store the characters of the message, the signal START/ drops to a low level, and the solid reset is removed from the binary counter 668. The counting input of the binary counter 668 is supplied with the character clock signal CH CLK. As set forth above, this signal rises to a more positive level following the receipt of each significant six bits of a message character. Accordingly, the binary counter 668 counts the number of characters in the received message. When the number of received characters exceeds the number N, the decoder 670 provides a more positive output through the OR gate 672 to set the error flip-flop 674. The setting of the error flip-flop 674 returns the system 14 to its scan mode in the manner described above. The signal ERROR also resets the digit buffer to clear the display 750. Incident to the restoration of the system 14 to its scan mode, the start flip-flop 610 is reset in the manner described above, and the signal START/ rises to a more positive potential to clear the binary counter 668. This removes the more positive output from the decoder 670.

Another error detected by the circuit 653 is the receipt of a complete code for a message character which is not in the proper 3 of 6 code. This error detection is performed by an AND gate 658, a modulo six counter 662, a decoder 664, and an AND gate 666. The modulo six counter 662 is reset to a normal condition by an AND gate 660 during the scan mode and at the end of the reading of each character into the data buffer 522. The two inputs to the AND gate 660 are the signals ZERO STATE and RESET T. The signal ZERO STATE is placed at a high level by the character counter 654 and the decoder 656 at the end of each character in the manner described above. The signal RESET T rises to a high level (see FIG. 4) following each bit clock signal BIT CLK. Thus, the modulo six counter 662 is normally in a reset condition at the beginning of the translation of each character code.

The counting input to the counter 662 is connected to the output of the AND gate 658 which is provided with three input signals DATA, DATA STROBE, and REFF/. The signal REFF/ becomes positive only after the insignificant bits have been translated by the circuit 500 in the manner described above. The signal DATA STROBE goes positive on each white-black and black-white transition. The signal DATA goes positive whenever a binary "1" is supplied to the counting input of the data buffer 522. Accordingly, the counter 662 is advanced to a setting representing the number of binary "1"s in the significant bits of a character code shifted into the data buffer 522.

The output of the counter 662 is coupled to the decoder 612. The output from the decoder 664 is a signal COUNT 3/ which rises to a more positive level only when the count in the counter 663 is other than three. Stated alternatively, the decoder 664 provides an inhibit to the connected input of the AND gate 666 whenever the expected three "1"s have been provided in the message character stored in the data buffer, thus indicating that a correct 3 of 6 code has been stored therein.

Assuming, however, that the character code stored in the data buffer 522 includes other than three binary "1"s, the signal COUNT 3/ enables one input to the AND gate 666. Another input to this gate is enabled by the signal START which is positive only when the system 14 is in a reading mode. The remaining input to the AND gate 666 is supplied by the character clock signal CH CLK. This signal rises to a more positive level when the six significant bits of a message character have been stored in the data buffer. At this time, the AND gate 666 is fully enabled and supplies a more positive signal through the OR gate 672 so that its leading edge switches the error flip-flop 674 to its set condition. The setting of the error flip-flop 674 returns the system 14 to its scan mode and clears the visual display 750 in the manner described above. The error flip-flop 674 is also reset when a proper start indication is received on a subsequent reading of the record 10, 20 by the reader 12 in the manner described above.

The resetting of the system 14 to its scan mode resets the start flip-flop 610 in the manner described above so that the modulo four character counter 654 is reset to zero and the decoder 656 enables the upper input to the reset AND gate 660. When the first following signal DATA STROBE is generated which results in the signal RESET T, the AND gate 660 is fully enabled and the modulo six counter 662 is reset to control the decoder 664 to remove the enabling signal COUNT 3/ from the AND gate 666.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. A coded record adapted for machine reading comprising
   a record member,
   and a series of segments of different first and second characteristics on said record member, the segments of first and second characteristics being alternated with each other in said series and the dimensions of the segments of both of said first and second characteristics being of more than two different values with the relative dimensions of sequentially-positioned pairs of segments providing a coded representation of a data value in which an increase in the relative widths of a sequentially-positioned pair of segments represents one binary value and a decrease in the relative widths of a sequentially-positioned pair of segments represents the opposite binary value, at least some of said segments forming a part of the coded representation of more than one data value.

2. A coded record comprising
   a record member with a surface of a first light reflecting characteristic,
   a plurality of areas on said surface spaced from each other along said path and having a second light reflecting characteristic, said areas being of more than two different widths and being spaced from each other by more than two different distances to define areas of said surface of first light relecting characteristics having more than two different widths, the areas of first and second light reflecting characteristics being arranged in a sequence and the relative widths of sequentially-positioned pairs of areas providing a coded representation of a bit value in which an increase in the relative widths of a sequentially-positioned pair of segments represents one binary value and a decrease in the relative widths of a sequentially-positioned pair of segments represents the opposite binary value.

3. The coded record set forth in claim 2 in which the width of a given area relative to the width of a preceding area in the sequence provides a coded representation of a bit value and the width of this same given area relative to the width of a following area in the sequence provides a coded representation of another bit value.

4. A coded record adapted for machine reading comprising
   a record member,
   and a series of segments of different first and second characteristics on said record member, the segments of first and second characteristics being alternated with each other in said series and the dimensions of the segments of both of said first and second characteristics being of more than two different values with the relative dimensions of different pairs of the segments providing coded representations of data values in which an increase in the relative widths of a sequentially-positioned pair of segments represents one binary value and a decrease in the relative widths of a sequentially-positioned pair of segments represents the opposite binary value.

5. A method of encoding a record which comprises the steps of
   producing on a record a series of areas of different first and second characteristics alternating with each other,
   assigning different pairs of said areas to represent different bit values to be encoded with at least some of the areas included in more than one pair,
   and varying the relative sizes of the areas in said different pairs of areas in a range including more than two different sizes so that the relative sizes of the areas in each pair of areas represents a bit value to be encoded, an increase in the relative widths of a sequentially-positioned pair of areas representing one binary value and a decrease in the relative widths of a sequentially-positioned pair of areas representing the opposite binary value.

6. A method of translating records binary coded by a sequence of alternate areas of first and second light reflecting characteristics each of which can have one of more than two different widths using a light responsive reader, which method comprises the steps of producing relative movement between the reader and the record so that the reader passes over all of the areas, producing a sequence of digital reader-controlled signals in which each signal corresponds to the width of one of the areas, including at least a first signal, a second signal following the first signal in the sequence, and a third signal following the second signal in the sequence, digitally comparing each two successive signals to determine the relative widths of successive areas, and in particular comparing the first signal to the second signal and comparing the second signal to the third signal, and registering binary "1"s and "0"s in accordance with the relative widths of the successive areas.

7. A method of translating records binary coded by a sequence of alternate areas of first and second light reflecting characteristics each of which can have one of at least two different widths using a light responsive reader, which method comprises the steps of producing relative movement between the reader and the record so that the reader passes over all of the areas, producing a sequence of digital reader-controlled signals in which each signal is based on the width of one of the areas, making a first digital comparison of a given signal in the sequence with a preceding signal in the sequence to determine the relative widths of the corresponding areas, registering a digital value in dependence on the relative widths determined in the first comparison, making a second digital comparison of said given signal with a subsequent signal in the sequence to determine the relative widths of the corresponding areas, and registering a digital value in dependence on the relative widths determined in the second comparison.

8. A method of interpreting records encoded with a sequence of areas of alternating different characteristics in which each area can have at least two different widths using a reader responsive to the different characteristics which comprises the steps of producing relative movement between the reader and the record so that the reader passes over all of the areas in sequence, generating a sequence of reader-controlled signals based on the widths of the areas, storing a pair of digital values under the control of the reader-controlled signals based on the widths of a given area and of a preceding area in the sequence, comparing the stored digital values to determine the relative widths of said given and preceding areas, producing a first digital weight indication in dependence on the determined relative widths of said given and preceding areas, clearing the stored value based on the width of said preceding area, storing a digital value under the control of the reader-controlled signals based on the width of an area subsequent to said given area in the sequence, comparing the stored digital values to determine the relative widths of said given area and said subsequent area, and producing a second digital weight indication in dependence on the determined relative width of said given and subsequent area.

9. A system for translating data from a record bearing alternate areas of different characteristics and different widths comprising a reader controlled by the record and supplying a sequence of signals corresponding to the widths of the areas, a pair of storage means controlled by the reader for storing representations of the widths of successive areas in accordance with the signals supplied by the reader, comparing means controlled by the pair of storage means for determining the greater than and less than relations between the width representations stored in the storage means, register means coupled to and controlled by the comparing means for storing different values in dependence on the greater than and less than relationships determined by the comparing means, and control means operable after each comparison by the comparing means for clearing alternate ones of the two storage means to receive a representation of the next area width under the control of the reader.

10. A system for translating a binary coded record having alternate areas of different first and second light reflecting characteristics and at least two different widths comprising a first storage means, a second storage means, light responsive means controlled by the record and responsive to the areas of first and second characteristics, first control means controlled by the light responsive means and coupled to the first and second storage means for storing successive width representations of areas of the first characteristic in the first storage means and successive width representations of the areas of the second characteristic in the second storage means, comparing means coupled to the first and second storage means for comparing the width representations stored therein, said comparing means making a comparison each time that a new representation is stored in one of the first and second storage means, indicating means controlled by the comparing means for providing a "1" or "0" indication in accordance with the width comparison made by the comparing means, and second control means controlled by the light responsive means and operable as successive areas are sensed for clearing alternate ones of the first and second storage means and for effecting in alternate sequence the comparison of the first and second storage means by the comparing means.

11. A system for translating records binary coded in "1"s and "0"s by pairs of areas of different relative width comprising first and second storage means, record reading means for reading the widths of the areas and supplying width representing signals, gating means coupled to the record reading means and the storage means and controlled by the width representing signals for storing the values of the widths of different pairs of areas in the first and second storage means, comparator means coupled to the first and second storage means and controlled by the values of the widths stored in the storage means to establish greater than and less than relations between the stored width values, indicating means coupled to and controlled by the comparator means for selectively providing binary "0" and "1" indications in accordance with the established greater than and less than relationships, and reset means controlled by the record reading means for clearing alternate ones of the first and second storage means as successive areas are read by the record reading means.

12. The system set forth in claim 11 including a counter in each of the first and second storage means, each of said counters having an input, a signal source supplying counter operating signals, and the gating means renders the signal source effective to supply counter operating signals to the inputs of the counters in alternate ones of the first and second storage means.

13. A system for reading records wherein each N bit character is encoded with a sequence of at least N + 1 alternate areas of different first and second characteristics and wherein the areas have at least two different widths comprising reader means for producing a sequence of alternate first and second signals representing the widths of the areas of first and second characteristics respectively, first and second storage means, a first control circuit coupled to the reader means and the first storage means and controlled by the first signals for storing values in the first storage means based on the widths of the areas of the first characteristic, a second control circuit coupled to the reader means and the second storage means and controlled by the second signals for storing values in the second storage means based on the widths of the areas of the second characteristic, comparing means for comparing the values in the first and second storage means to determine the relative widths of the second area using the first areas as a reference and of the first area using the second areas as a reference, said comparing means providing an output signal representing a binary "1" or "0" based on the results of the value comparison, and resetting means controlled by the first and second signals for clearing values from alternate ones of the first and second storage means so that each area is used in two area width representations.

14. An apparatus for extracting information from a record encoded with a sequence of areas of alternate differing optical characteristics in which each area can have at least two different widths comprising optical scanning means for scanning the record, including means for generating a binary signal whose state indicates the characteristics of the area scanned at any given moment, timing means for generating a sequence of signals each corresponding to the amount of time which elapses between two successive reversals of said binary signal, said sequence of signals including at least a first signal, a second signal subsequent to said first signal in the sequence, and a third signal subsequent to said first and second signals in the sequence, comparison means connecting to said timing means for comparing said first signal to said second signal and for comparing said second signal to said third signal, said comparison means including means for generating an output signal which indicates the comparison results, and means for storing successive output signals supplied by said comparison means.

15. An apparatus for extracting information from a record encoded with a sequence of areas in which each area can have at least two different widths comprising reader means controlled by the record for supplying a time-sequence of signals corresponding to the widths of the sequence of areas on the record, said time-sequence of signals including at least a first signal, a second signal subsequent to said first signal in said sequence of signals, and a third signal subsequent to said first and second signals in said sequence of signals, first storage means for storing at least two of said signals, means for feeding at least said first, second and third signals into said first storage means one after another in such a manner that as each new signal is fed into the first storage means the signal that has been stored within the first storage means for the longest time is removed from the storage means, comparison means for comparing the signal most recently fed into said first storage means to the signal that has been stored within the first storage means for the longest time, including means for generating a digital output which indicates the result of the comparison, second storage means for storing digital outputs, and means for feeding the digital output of said comparison means into said second storage means each time that a new signal is fed into said first storage means by said means for feeding.

16. An apparatus in accordance with claim 15 wherein the reader means includes means for generating a first binary signal that reverses its state at the end of time intervals proportional to the width of areas, and wherein the means for feeding includes means for generating a second signal after each reversal of said binary signal and means responsive to said second signal for transferring digital data from the digital output of said comparison means into said second storage means.

17. An apparatus in accordance with claim 16 wherein the means for generating said second signal comprises first pulse generating means having said first binary signal as an input for generating a first pulse in response to a fluctuation of said first binary signal in a first direction, second pulse generating means having said first binary signal as an input for generating a second pulse in response to a fluctuation of said binary signal in a second, opposite direction, and pulse signal combining means having inputs to which said first and second pulses are applied and having an output at which said second signal appears for ORing together the pulses generated by said first and second pulse generating means to form said second signal.

18. In a system for interpreting records coded by areas of alternating characteristics and varying widths, first and second storage means for storing representations of the widths of sequential areas, first control means controlled by the storage means for determining the relative widths of the areas stored in the first and second storage means, signal means providing a control signal representing the sequence of storing width representations in the first and second storage means, and second control means coupled to and controlled by the first control means and the signal means for supplying an output signal representing code values in accordance with the determined relative widths and the sequence of stored widths.

19. A system for translating a binary coded record having alternate areas of different first and second light reflecting characteristics and at least two different widths comprising means for optically scanning said record including means for generating a binary signal whose state indicates whether an area being scanned is of said first or said second light reflecting characteristic, first and second storage means, means for developing within alternate ones of said storage means signals indicating the length of time said binary signal remains in either of its states and thereby representing the widths of said alternate areas, means for comparing the signals stored in said storage means including means for generating a digital signal indicating their relative sizes, and means controlled by said binary signal and having said digital signal as an input for reversing the sense of the relative size data conveyed by said digital signal when said binary signal is in one of its two states.

20. A system in accordance with claim 14 wherein said means for reversing comprises an exclusive OR logic gate having said binary signal and said digital signal as input signals.

* * * * *